Figure 1:
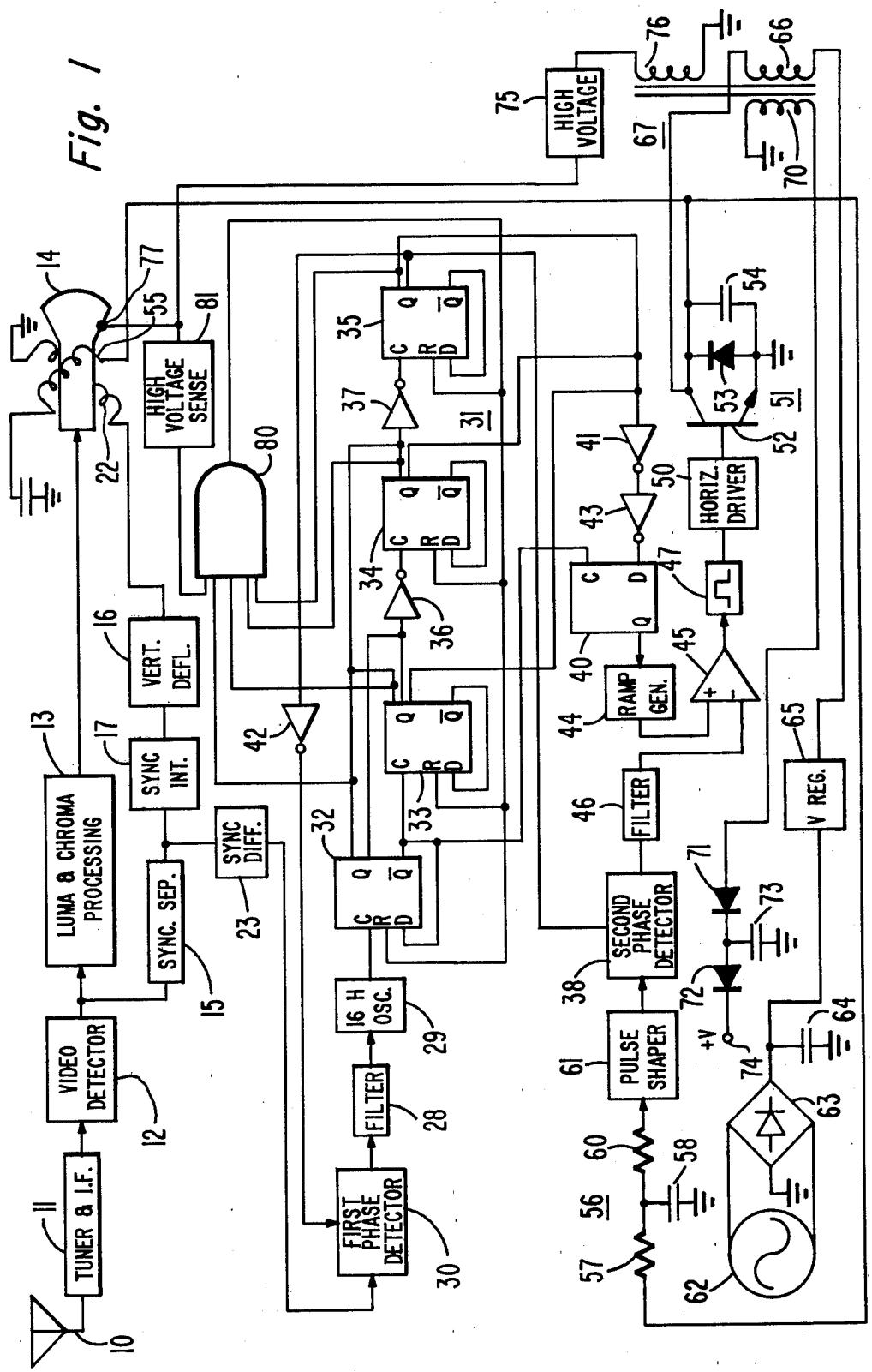

United States Patent [19]

Lang

[11] 4,412,254

[45] Oct. 25, 1983

[54] TELEVISION RECEIVER HIGH VOLTAGE PROTECTION CIRCUIT

[75] Inventor: Frank B. Lang, Princeton Junction, N.J.

[73] Assignee: RCA Corporation, New York, N.Y.

[21] Appl. No.: 276,897

[22] Filed: Jun. 24, 1981

[51] Int. Cl.³ .............................................. H04N 5/68
[52] U.S. Cl. .................................. 358/243; 315/411
[58] Field of Search ....................... 358/243; 315/411

[56] References Cited

U.S. PATENT DOCUMENTS

| | | |
|---|---|---|
| 3,611,002 | 10/1971 | Wedam . |
| 3,688,031 | 8/1972 | Fitzgerald, Jr. et al. . |
| 3,692,932 | 9/1972 | Wilmarth . |
| 3,789,260 | 1/1974 | Ahrens . |
| 3,813,580 | 5/1974 | Norman . |
| 3,885,201 | 5/1975 | Fernsler . |
| 4,058,754 | 11/1977 | Ohnishi et al. . |
| 4,074,323 | 2/1978 | Griffey . |

Primary Examiner—Richard Murray
Attorney, Agent, or Firm—Paul J. Rasmussen; William H. Meise; Scott J. Stevens

[57] ABSTRACT

A high voltage holddown circuit is used in a television receiver which derives high voltage potential from horizontal flyback pulses and which provides horizontal rate signals to the horizontal deflection circuit via a high frequency countdown arrangement. The holddown circuit operates by changing the divider modulus of the countdown circuitry during an overvoltage condition which reduces the amplitude of the flyback pulses and consequently reduces the high voltage.

12 Claims, 8 Drawing Figures

TELEVISION RECEIVER HIGH VOLTAGE PROTECTION CIRCUIT

This invention relates to high voltage protection circuitry for reducing the danger of X-ray emissions from a television receiver, and, in particular, to protection circuitry for use in a receiver providing countdown-derived horizontal rate signals.

Some television receivers derive high voltage electron beam accelerating potential from the horizontal deflection rate flyback or retrace pulses. These retrace pulses are applied to a winding of a high voltage transformer which multiplies the retrace pulse voltage to provide high voltage pulses. The high voltage pulses are rectified and filtered to generate the required high voltage beam accelerating or ultor potential, which for a color television receiver, may be of the order of 30 kV.

When the high energy electron beams strike the kinescope shadow mask, X-rays are produced. Under normal receiver operation, these X-rays are substantially prevented from reaching the viewer by shielding material and absorbtion by the kinescope glass. If the high voltage level should rise, for example, because of a fault in the high voltage transformer or the receiver power supply, the level of generated X-rays will increase. If the X-ray level rises appreciably, the normal receiver protection mechanisms may become ineffective, subjecting the viewer to a potentially dangerous condition.

In the interest of safety, it is important that the receiver be equipped with some means for alerting the viewer that an unsafe condition is present and/or reducing the high voltage level, which may be accomplished by automatically turning the set off. It is also desirable to provide some means for informing a serviceman as to the nature of the receiver malfunction, so that the appropriate repair may be made.

With receivers of the previously-described type which derive high voltage from horizontal retrace pulses, it is possible to provide a reduction in high voltage during a potentially dangerous overvoltage condition by changing the frequency of the horizontal oscillator. This causes improper horizontal synchronism, resulting in inefficient energy transfer into and out of the deflection yoke. The retrace pulses will become lower in amplitude causing the high voltage level to also be reduced in amplitude, thereby alleviating the danger of excessive X-ray emission. Additionally, improper horizontal synchronism will present an unviewable picture, inducing the viewer to turn off the set and have it properly serviced.

In receivers having LC or RC horizontal oscillators, it is relatively easy to change the oscillator frequency, for example, by altering the input or output impedance of the oscillator. Receivers having high frequency crystal oscillators or resonators which derive the horizontal and vertical rate signals via countdown or divider circuitry are not so easily modified. Oscillators of this type may be controlled by automatic frequency and phase control (AFPC) circuitry which maintains the oscillator frequency within a predetermined range. The AFPC circuitry makes it difficult to pull the horizontal oscillator off frequency since the phase locked loop characteristic of the AFPC circuits attempts to return the oscillator to the correct frequency.

The present invention comprises high voltage holddown means for use in a television receiver having frequency and phase control circuitry and countdown-derived horizontal rate signals. The high voltage holddown means changes the horizontal scanning frequency in the presence of a high voltage overvoltage condition in order to reduce the high voltage amplitude to prevent excessive X-ray emission.

In accordance with the present invention a high voltage holddown circuit is used in a television receiver having a kinescope and a source of high voltage derived from a horizontal rate signal. A high frequency oscillator and a counter coupled to the oscillator incorporates a plurality of resettable counting means for providing a horizontal rate signal. The high voltage holddown means comprises high voltage sensing means having an input coupled to the source of voltage and an output for providing an indication of excessively high voltage. Resetting means coupled to the output of the high voltage sensing means and to the resettable counting means is responsive to the excessively high voltage indication for resetting the resettable counting means such that the counter provides a signal having a frequency different than the horizontal rate in order to reduce the amplitude of the high voltage potential.

In the accompanying drawing, FIG. 1 illustrates in schematic and block diagram form a television receiver incorporating the high voltage holdown circuit in accordance with the present invention; and FIGS. 2a–g illustrates waveforms useful in understanding the receiver of FIG. 1.

The television receiver shown in FIG. 1 includes an antenna 10 which applies radio frequency signals to the tuner and intermediate frequency circuitry 11 of the receiver. I.F. signals are applied to a video detector 12, which produces a composite video signal. The video information of the composite video signal is processed by luminance and chrominance processing circuitry 13, which applies video drive signals to a kinescope 14.

The composite video signal is also supplied to a sync separator 15, which separates the horizontal and vertical sync signals from the video information. This composite sync signal is applied to a vertical deflection circuit 16 by way of a sync integrator 17. The sync integrator 17 supplies integrated vertical sync pulses to the vertical deflection circuit to establish the timing of vertical deflection waveforms which are applied to a vertical deflection winding 22 on the kinescope.

A sync differentiator 23 separates horizontal sync information from the composite sync signal and provides horizontal sync signals to the first loop of a horizontal AFPC system. The horizontal sync signals are applied to one input of a first phase detector 30. The first phase detector 30 also receives at a second input a signal at the horizontal deflection frequency from a frequency divider or counter 31. The output signal resulting from a phase comparison of these two signals is filtered by a filter 28 and applied as a control signal to a 16H oscillator, having a nominal frequency which is sixteen times the desired horizontal scanning frequency. The oscillator 29 produces an output signal which is applied to the counter 31.

The counter divides the oscillator output signal frequency by sixteen to produce a signal at the fundamental horizontal frequency for the first phase detector. The counter comprises four cascaded "data" or D-type flip-flops 32, 33, 34 and 35. Each flip-flop has its $\overline{Q}$ output connected to its D input to divide the clock signal applied to its C input by two. Each flip-flop also has a number of Q outputs which are internally buffered from each other so that the grounding of one Q output will not effect the output levels of the other Q outputs of the flip-flop.

Flip-flop 32 receives the oscillator output signal at its C input and has its Q output connected to the input of an inverter 36 and the input of an inverter 37. The $\overline{Q}$ output of flip-flop 32 is coupled to the C input of flip-flop 33 and the C input of a flip-flop 40. Flip-flop 33 has three Q outputs coupled to the input of inverter 36, the input of inverter 37, and the input of an inverter 41, respectively. The output of inverter 37 is coupled to the C input of flip-flop 34, which has two Q outputs coupled to the input of inverter 37, and the input of inverter 41, respectively. The output of inverter 37 is coupled to the C input of flip-flop 35. Flip-flop 35 has a first Q output coupled to the input of an inverter 42 and to a second phase detector 38, and a second Q output coupled to the input of inverter 41. The output of inverter 42 supplies a horizontal rate signal to the first phase detector 30.

The output of inverter 31 is coupled to the D input of flip-flop 40 by another inverter 43. The Q output of flip-flop 40 is coupled to the input of a ramp generator 44, the output of which is coupled to the input of a comparison circuit 45.

The output of the second phase detector 38 is filtered by a filter 46 and the filtered output signal is applied to a second input of comparison circuit 45. The output of the comparison circuit 45 is coupled to a pulse generator 47, the output of which supplies a fixed duration horizontal deflection drive signal to a horizontal driver circuit 50. The horizontal driver circuit 50 supplies horizontal deflection drive waveforms to a horizontal deflection output circuit 51. Output circuit 51 includes an output transistor 52 coupled in parallel with a damper diode 53 and a retrace capacitor 54. Output circuit 51 supplies deflection current to winding 55 on the kinescope 14, and develops flyback pulses for the second phase detector 38. The flyback pulses are filtered by a "T" lowpass filter 56, which includes a first series resistor 57, a shunt capacitor 58, and a second series resistor 60. The resistor 60 is coupled to the input of a pulse shaper 61, which squares up the filtered flyback pulses and applies them to the second input of the second phase detector 38. The output of second phase detector 38 is a signal representative of the time difference between the horizontal retrace pulse and the pulse from divider 31 which is locked to the incoming horizontal sync pulses.

An ac line source 62 provides a voltage which is rectified by a diode bridge 63 and charges a filter capacitor 64 to develop a raw or unregulated B+ voltage. The raw B+ ac line voltage is applied to an input of a B+ regulator circuit 65. The output of regulator circuit 65 is the regulated B+ voltage which is applied by way of the primary winding 66 of a transformer 67 to energize horizontal output circuit 51.

The receiver of FIG. 1 also includes a source of regulated voltage +V which includes a winding 70 of transformer 67 coupled via diodes 71 and 72 and a capacitor 73 to a voltage terminal 74. The +V regulated voltage may be used to power oscillator 33 or divider 31, for example.

Horizontal flyback pulses are also applied to a high voltage circuit 75 via a voltage step-up winding 76 of transformer 67. High voltage circuit 75 rectifies and filters the stepped up flyback pulses to produce the high voltage beam accelerating or ultor potential which is applied to kinescope 14 at an ultor terminal 77.

In accordance with the present invention, the receiver of FIG. 1 incorporates a high voltage protection and holddown circuit comprising a gate 80 having inputs coupled to the outputs of flip-flops 32, 33, 34 and 35. An input of gate 80 is also coupled to a high voltage sensing circuit 81 which in turn is coupled to the ultor terminal 77 of kinescope 14.

Figure 2:
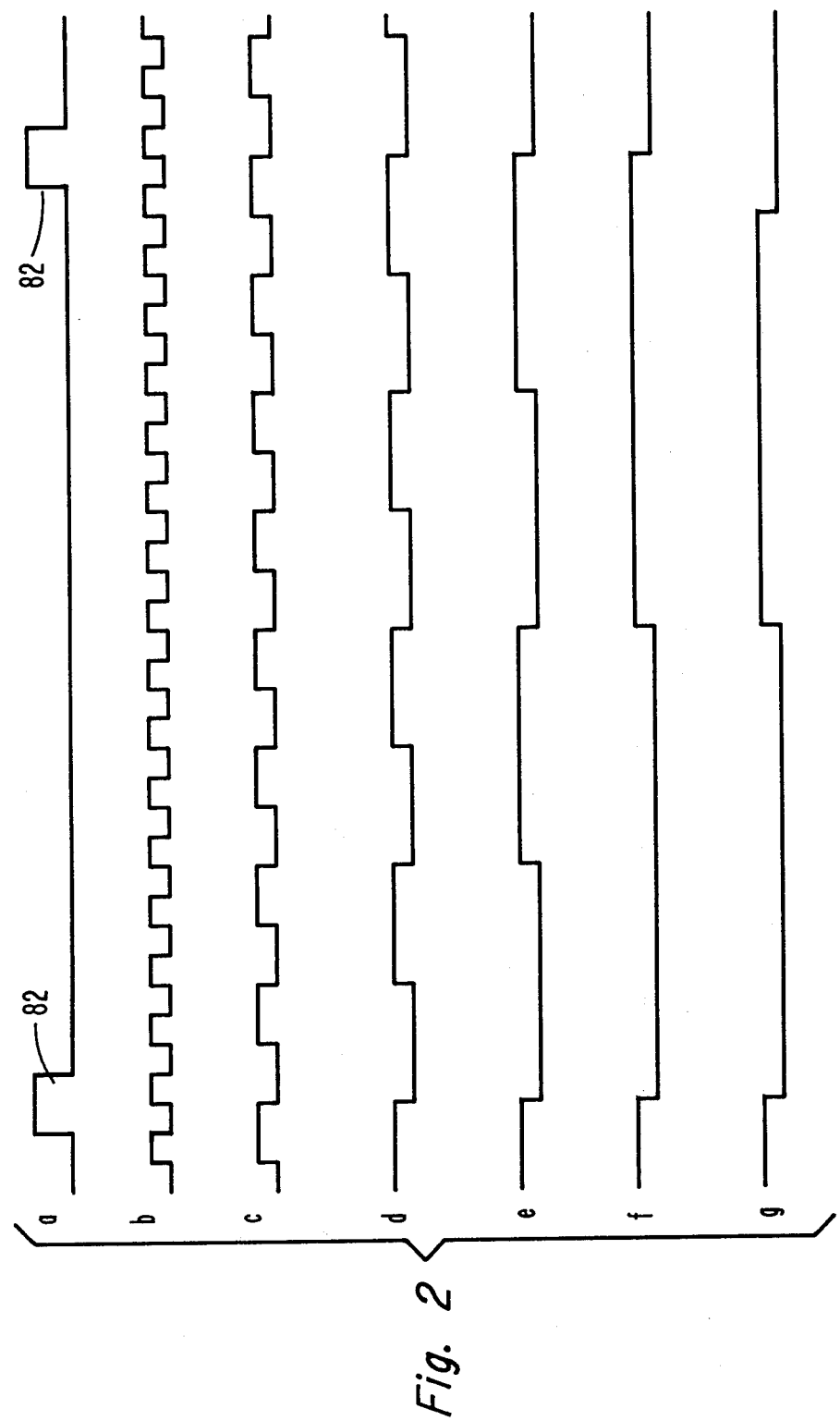

The operation of the arrangement of FIG. 1 may be understood by referring to the waveforms of FIG. 2 together with FIG. 1.

FIG. 2a illustrates horizontal sync pulses 82. These pulses are applied to the input of the first phase detector 30 by differentiator 23. In the embodiment of FIG. 1, standard horizontal sync pulses having a duration of 4.7 microseconds are narrowed to a pulse width of 3.8 to 4.0 microseconds by the differentiator 23.

When the first AFPC loop is synchronized, the 16H oscillator 29 produces an output waveform of approximately 252 kHz, shown in FIG. 2b. The pulse train of FIG. 2b is divided in half by flip-flop 32 to produce the waveform of FIG. 2c. It may be seen that all of the flip-flops of this embodiment change state on the positive clock edge; however, negative edge-triggered flip-flops may also be used.

Flip-flop 33 receives the inverse of the waveform of FIG. 2c from the $\overline{Q}$ output of flip-flop 32 and produces the waveform shown in FIG. 2d. The waveform of FIG. 2d is ANDed with the waveform of FIG. 2c at the input of inverter 36 to produce a low output signal whenever both input signals are in their high states. By reason of the ANDing with the waveform of FIG. 2c, flip-flop 34 will be switched synchronously with the output signal of flip-flop 32.

Flip-flop 34 switches to produce an output waveform as shown in FIG. 2e. This waveform is ANDed with the waveforms of FIGS. 2c and 2d at the input of inverter 37 to produce a waveform at the output of the inverter, which is synchronous with the waveform of FIG. 2c. Flip-flop 35 changes state on the positive-going edges of this waveform, producing a horizontal-rate output waveform as shown in FIG. 2f. This horizontal rate waveform is inverted by inverter 42 to produce a horizontal-rate waveform, which is applied to the first phase detector 30.

The first AFPC loop will act to locate the positive-going transitions of the horizontal rate waveform with the center points of sync pulses 82. The horizontal rate waveform of FIG. 2f is also applied to phase detector 38 of the second AFPC loop. The second loop will then tend to align the center of the flyback pulse with the transitions of the waveform of FIG. 2f in a known manner.

During normal operation, counter 31 divides the frequency of the output of oscillator 29 by sixteen to provide the desired horizontal rate signals for phase detectors 30 and 38, and ramp generator 44. Comparator 45 compares a recurrent horizontal rate ramp voltage from ramp generator 44, with a dc voltage from filter 46. Comparator 45 generates a trigger pulse output resulting from the intersection of the ramp and the dc voltage. The time of intersection may vary from line to line in order to maintain proper phase synchronism between the flyback pulses and the horizontal synchronizing pulses for proper horizontal centering of the scanned television raster.

During an overvoltage condition in which the high voltage level exceeds acceptable limits, as determined by high voltage sensing circuit 81, the high voltage protection and holddown circuit works in the following manner. Gate 80, illustratively shown as an AND gate in FIG. 1, is coupled to the output of flip-flops 32, 33, 34 and 35 of counter 31 and to the output of high voltage sensing circuit 81. During normal operation as previously described, counter 31 divides the oscillator frequency by sixteen to produce desired horizontal rate signals at a nominal frequency of 15,734 Hz. When an overvoltage condition is present, high voltage sensing circuit 81 provides an output which is applied to gate 80. When gate 80 senses a high output from each of flip-flops 32, 33, 34 and 35, indicative of a count of fifteen, gate 80 is enabled and produces an output which is simultaneously applied to the reset lines of flip-flops 32, 33, 34 and 35. This effectively changes the divider modulus of counter 31 to cause it to divide by fifteen rather than sixteen, producing signals as show in FIG. 2g at a nominal frequency of 16,783 Hz. This signal then has an offset of 1049 Hz from the normal horizontal rate signals. This frequency offset is greater than the operative range of the phase locked loops of the AFPC circuits, and the pull-in range of a horizontal hold control, so the counter frequency cannot be brought into synchronism with the incoming horizontal sync pulses. This out-of-synchronism condition will result in the receivers horizontal deflection circuits triggering improperly with the further result that deflection energy is transferred less efficiently into and out of the deflection yoke, causing lower amplitude retrace pulses to be produced. This in turn causes the retrace pulse-derived high voltage to decrease, thereby alleviating the overvoltage condition. The lack of horizontal deflection synchronism also results in a scrambled raster, which will induce the viewer to turn off the set and have it serviced. The fixed frequency offset and particular counter output frequency provided by the high voltage protection circuit shown in FIG. 1 provides a source of information to the serviceman. By measuring the frequency of the counter output, a serviceman may determine if an overvoltage condition exists and make appropriate repairs. Additional gates similar to gate 80 could be used to change the counter output frequency by different offset amounts to produce unique counter output frequencies in response to different fault conditions, so that a simple measurement of counter output frequency could immediately identify any of a number of receiver faults.

In addition to resetting flip-flops 32, 33, 34 and 35, gate 80 may also be used to disable circuits which produce signals from the counter output signals, such as clamp pulses, burst gate or blanking pulses, in order to further reduce the danger of X-ray emission.

The previously described arrangement is, of course, illustrative only, and other oscillator frequencies or divider modulus changes are possible. The operating or triggering logic of the flip-flops selected will determine the gating logic necessary to ensure proper operation.

What is claimed is:

1. In a television receiver having a high frequency oscillator and a counter coupled to said oscillator incorporating a plurality of resettable counting means for providing a horizontal rate signal, means comprising:
   fault sensing means having an output for providing an indication of a receiver malfunction; and
   resetting means coupled to said output of said fault sensing means and to said resettable counting means, and responsive to said malfunction indication for resetting said resettable counting means such that said counter provides a signal having a frequency different than said horizontal rate.

2. The arrangement defined in claim 1, wherein said resettable counting means comprises binary counting stages.

3. The arrangement defined in claim 2, wherein each of said binary counting stages comprises a flip-flop.

4. The arrangement defined in claim 1, wherein said resetting means changes the divider modulus of said counter.

5. In a television receiver having a kinescope, a source of high voltage potential derived from a horizontal rate signal, a high frequency oscillator and a counter coupled to said oscillator incorporating a plurality of resettable counting means for providing a horizontal rate signal, a high voltage holddown means comprising:
   high voltage sensing means having an input coupled to said source of high voltage and having an output for providing an indication of excessively high voltage; and
   resetting means coupled to said output of said high voltage sensing means and to said resettable counting means, and responsive to said excessively high voltage indication for resetting said resettable counting means such that said counter provides a signal having a frequency different than said horizontal rate, whereby said high voltage potential is reduced in amplitude.

6. The arrangement defined in claim 5, wherein said high voltage potential is derived from horizontal flyback pulses.

7. The arrangement defined in claim 5 wherein said high voltage sensing means is coupled to the high voltage electrode of said kinescope.

8. The arrangement defined in claim 5, wherein said high voltage sensing means is coupled to a winding of a transformer.

9. A protection means for use in a television receiver comprising:
   a source of reference horizontal rate signals;
   oscillator means including first and second controllable frequency-determining elements for providing an output signal;
   phase-lock loop means coupled to said source of reference horizontal rate signals and to said first controllable frequency-determining element for drawing the frequency and phase of said oscillator means output signal toward the frequency and phase of said reference horizontal rate signals in a feedback manner when the frequency of said oscillator means output signals are within a predetermined lock-in frequency range with respect to the frequency of said horizontal rate reference signals;
   fault sensing means for providing an output signal as an indication of a malfunction of said receiver; and
   switchable coupling means coupled to said fault sensing means and to said second controllable frequency-determining element for changing the characteristics of said second controllable frequency-determining element in a switched manner for changing the frequency of said oscillator means output signal to be outside said lock-in frequency range of said phase-lock loop means.

10. The arrangement defined in claim 9, wherein said second controllable frequency-determining element comprises a frequency divider having a predetermined divider modulus.

11. The arrangement defined in claim 10 wherein said second controllable frequency-determining element is responsive to said fault sensing means output signal in such a manner that said divider modulus is changed.

12. Protection means for use in a television receiver comprising:

oscillator means, normally providing a horizontal rate signal, incorporating frequency control means comprising a first frequency control element, a second frequency control element, and feedback means, said first frequency control element coupled to said feedback means for adjusting the frequency of said horizontal rate signal over a frequency control range, said second frequency control element responsive to the output of said first frequency control element for providing said adjusted horizontal rate signal;

fault sensing means for providing an output signal as an indication of a malfunction of said receiver; and means for applying said fault sensing means output signal to said second frequency control element in order to switch the operation of said second frequency control element such that the frequency of the output signal of said second frequency control element is outside said frequency control range.

* * * * *

UNITED STATES PATENT AND TRADEMARK OFFICE
CERTIFICATE OF CORRECTION

PATENT NO. : 4,412,254

DATED : October 25, 1983

INVENTOR(S) : Frank B. Lang

It is certified that error appears in the above-identified patent and that said Letters Patent is hereby corrected as shown below:

Column 3, line 11, that portion reading "37" should read -- 36 --; line 20, that portion reading "31" should read -- 41 --. Column 4, line 66, after "During" insert -- a receiver malfunction, such as --; line 68, after "by" insert -- a fault sensing means such as --.

Signed and Sealed this

Twenty-fourth Day of July 1984

[SEAL]

Attest:

GERALD J. MOSSINGHOFF

Attesting Officer    Commissioner of Patents and Trademarks